United States Patent [19]

Doi et al.

[11] Patent Number: 5,394,533
[45] Date of Patent: Feb. 28, 1995

[54] CACHE SYSTEM HAVING ONLY ENTRIES NEAR BLOCK BOUNDARIES

[75] Inventors: Toshio Doi; Shigeo Mizugaki, both of Hyogo, Japan

[73] Assignee: Mitsubishi Denki Kabushiki Kaisha, Tokyo, Japan

[21] Appl. No.: 869,699

[22] Filed: Apr. 16, 1992

[30] Foreign Application Priority Data

May 2, 1991 [JP] Japan .................................. 3-130624

[51] Int. Cl.6 ..................... G06F 12/00; G06F 12/08; G06F 12/14
[52] U.S. Cl. ................................. 395/425; 364/243.41; 364/246; 364/246.6; 364/246.7; 364/253; 364/DIG. 1
[58] Field of Search ................................ 395/425, 400

[56] References Cited

U.S. PATENT DOCUMENTS

| | | | |
|---|---|---|---|
| 4,332,010 | 5/1982 | Messina et al. | 395/425 |
| 4,885,680 | 12/1989 | Anthony et al. | 395/425 |
| 4,991,082 | 2/1991 | Yoshizawa et al. | 395/400 |
| 5,091,846 | 2/1992 | Sachs et al. | 395/425 X |

*Primary Examiner*—Jack B. Harvey
*Assistant Examiner*—Michael A. Whitfield
*Attorney, Agent, or Firm*—Townsend and Townsend Khourie and Crew

[57] ABSTRACT

A data cache, for use in a memory having an address space including tag addresses for identifying blocks of storage locations and a set of select addresses for identifying storage locations in a block, includes a set select decoder that decodes only a subset of said set of select addresses that identify sub-blocks of storage locations located at the upper and lower boundaries of a block. Thus, data in storage locations accessed by addresses near block boundaries which have a high number of bit transitions is registered to the cache so that the high number of bit transitions does not have to be driven on an external bus so that noise is reduced.

3 Claims, 5 Drawing Sheets

CACHE SYSTEM HAVING ONLY ENTRIES NEAR BLOCK BOUNDARIES

BACKGROUND OF THE INVENTION

1. Field of the Invention

The present invention relates generally to a system for controlling a microcomputer, and more particularly to such a control system for a microcomputer equipped with a cache.

2. Description of the Prior Art

FIG. 2 is a block diagram showing a general arrangement of a microcomputer. In FIG. 2, numeral 1 represents a microcomputer core for processing data, 2 designates a cache for storing a portion of data of an external storage device in connection with an address for the data, 3 depicts a bus control section for controlling the flow of data between the computer core 1, the cache 2 and an external storage device, 4 denotes an external address bus, 5 indicates an internal address bus, 6 is an external data bus, and 7 designates an internal data bus. Further, numeral 8 represents a microcomputer comprising the microcomputer core 1, the bus control section 3 and the cache 2, and 9 depicts an external storage device for storing data to be processed by the microcomputer core 1.

FIG. 4 is a schematic illustration of a conventional arrangement of a cache (memory). In FIG. 4, numeral 10 represents an input address received from the internal address bus 5, 11 designates a tag address for the input address 10, 12 depicts a set select address for the input address 10, 13 denotes a data memory section for storing the data of the external storage device 9 by 256 sets (address) ×2 way pages, 14 indicates a tag memory section for storing as the data tag a portion of the addresses on the external storage device 9 for the data to be registered in the data memory section 13 by 256 sets ×2 ways, 15 indicates a set select decoder section for respectively outputting the tag address and data by 1 set ×2 ways from the corresponding tag memory section 14 and data memory section 13 on the basis of the set select address 12, and 16 is a 2-way comparator for comparing the tag address of 1 set ×2 ways outputted from the tag memory section 14 with the tag address 11 of the input address 10 at every way. Further, numeral 17 represents a way selector section for outputting the way data of the data outputted from 2 ways of the data memory section 13 which are verified by the comparator to be in the coincidence states, and 18 designates an output data to be outputted from the cache 2 to the internal data bus 7. Here, the set represents the line address, the way designates the overlapped page of the tag memory 14 or the data memory section 13 where the 0th way indicates the first page and the first way indicates the second page. Accordingly, the capacities of the tag memory 14 and the data memory section 13 are 256×2×8 bits=32×16×8 bits and 32×16×16 bits, respectively.

Each address of 256 sets in the set select decoder section 15 directly corresponds to the set select address 12, and hence each set is expressed by "0000 0000", "0101 1010", for example. The two ways to be selected by the way selector section 17 are respectively expressed by the 0th way and the first way. The data corresponding to the address "0000 0000 0000 0000" is expressed by "(0000 0000 0000 0000)". FIG. 5 is a memory map showing the operation of a conventional cache.

A description will be made hereinbelow with reference to FIGS. 2 and 4 in terms of the data flow in a conventional microcomputer having a cache therein, where for brevity only the instruction for the microcomputer core 1 is considered as the data of the external storage device. The description is first made in terms of the data flow for the FIG. 2 microcomputer 8. The microcomputer core 1 outputs an address to the internal address bus 5 and the instruction data outputted from the cache 2 or the external storage device 9 is supplied through the internal data bus 7 to the microcomputer core 1. When reading out the data from the cache 2, the bus control section 3 sets the external address bus 4 to the high-impedance state. When reading the data from the external storage device 9, the bus control section 3 outputs an address signal to the external address bus 4 so as to read the data from the external data bus 6. This data is given through the internal data bus 7 to the microcomputer core 1 and the registration thereof is made with respect to either of the ways of the cache 2. With a portion of the address 10 to be outputted from the microcomputer core 1 being set as the tag address 11 and the other portion thereof being set as the select address 12, the data of the external storage device 9 to which the microcomputer core 1 accesses is stored in the data memory section 13. Here, the capacity of the external storage device 9 is extremely greater than that of the data memory section 13 of the cache memory 2. The tag address constituting the address of the data stored in the data memory section 13 is stored in the tag memory section 14.

The data flow of the cache will be described hereinbelow with reference to FIG. 4. The input address 10 is received from the microcomputer core 1. The set select address of the input address 10 is given to the set select decoder section 15. The set select decoder section 15 gives set select signals to the ways of the tag memory section 14 and data memory section 13. Each way of the tag memory section 14 supplies a set of tag addresses selected to the comparator 16 corresponding to the way. Each of way of the data memory section 13 outputs a set of data, selected in accordance with the set select signal, to the way selector section 17. The corresponding comparator 16 with a channel performs the comparison between the tag address 11 of the input address 10 and each tag address outputted from each way of the tag memory section 14. The information relating to the way in which the tag addresses are in the coincidence relation to each other is given to the way selector section 17 so that the way selector section 17 outputs the data corresponding to the input address 10. If all the ways are in non-coincident states, the bus control section 3 performs the registration with respect to either of the ways of the data memory section 13.

Secondly, a description will be made hereinbelow with reference to FIGS. 4 and 5 in terms of the registration to the cache 2. For example, in the case that the microcomputer core 1 outputs the addresses from "0000 0000 0000 0000" to "0000 0000 1111 1111" in sequence when the addresses output are not registered in the cache, the tag address "0000 0000" is registered to the tag memory section 14 where the 0th way is the set "0000 0000" and the data "(0000 0000 0000 0000)" is registered to the data memory section 13 where the 0th way is the set "0000 0000", and further the registrations are successively effected to the 0th-way set "0000 0001", 0th-way set "0000 0010"... 0th-way set "1111 1111". In addition, in the cases where the microcomputer core 1 subsequently outputs the addresses from "0000 0001 0000 0000" to "0000 0001 1111 1111" in sequence, the data are registered into the first-way set "0000 0000" to the first-way set "1111 1111". Moreover, in cases where the microcomputer core 1 continuously outputs the addresses from "0000 0010 0000 0000" to "0000 0010 0111 0111" in sequence, data are newly registered to the 0th-way set "0000 0000" to the 0th-way set "0111 0111" and the previously registered data "(0000 0000 0000 0000)" to "(0000 0000 0111 0111)" are deleted.

Further, a description will be made hereinbelow with reference to FIGS. 4 and 5 in terms of reading-out data from the cache 2. In the case that the microcomputer core 1 repeatedly outputs the addresses from "0000 0010 0000 0000" to "0000 0010 0111 0111" under the condition that the data is registered in the cache 2 as described above, the data registered in the 0th-way set "0000 0000" to the 0th-way set "0111 0111" are outputted from the cache 2 and the external address bus 4 of the microcomputer 8 enters into the high-impedance state. For example, in cases where the microcomputer core 1 outputs "0000 0010 0000 0000", the set "0000 0000" is selected, and the tag address "0000 0010" is outputted from the 0th-way set "0000 0000" of the tag memory section 14 and the tag address "0000 000 1" is outputted from the first-way set "0000 0000" of the tag memory section 14. The tag address of each way is compared with the tag address "0000 0010" of the input address in the comparator 16. Here, since the 0th-way tag address enters into the coincident state, the data "(0000 0010 0000 0000)" of the 0th-way set "0000 0000" is outputted from the way selector section 17.

Since the external address bus 4 has a greater load as compared with the internal address bus 5, the address is arranged to be outputted by the aid of a transistor having a large drive ability. Thus, the amplitude of the current provided to the external bus will vary greatly when a large number of signal lines have to be switched from carrying no current, logic "0", to carrying high current, logic "0". In the case where the address varies from "1111 1111 1111 1111" to "0000 0000 0000 0000" a large variation of current carried by the bus occurs because the current carried in each of the 16 bus lines varies from a high value to a low value thereby causing noise to generate in signal lines coupled to power and ground. Since in the conventional microcomputer 8 having a cache therein the external address bus takes the high-impedance state when the data registered in the cache is read out by the microcomputer core 1, the transistor having a large drive ability does not operate. The conventional cache equally performs the registration with respect to all regions of the external storage device, and hence the addresses to be outputted also become uniform. Accordingly, the large amplitude variation such as variation from "1111 1111 1111 1111" to "0000 0000 0000 0000" and the small amplitude variation such as variation from "0000 0000 0000 0000" to "0000 0000 0000 0001" occur with the same probability. That is, the conventional cache is not equipped with the countermeasures for preventing the noises.

SUMMARY OF THE INVENTION

The present invention contemplates to more positively reduce noises, as compared with the conventional cache, by using the fact that in the microcomputer with the cache the external address bus enters into the high-impedance state when the microcomputer core reads out the data registered in the cache.

In a microcomputer-controlling system according the present invention, a region in a sequence of memory addresses where a portion of an address changes between a bit pattern consisting of all logic "1"s to a bit pattern consisting of all logic "0"s is referred to as a page boundary region. The range of memory address bit patterns which are registrable in the cache is limited so that only regions of memory address bit patterns adjacent to a page boundary are selectively registered in the cache.

Further, in the arrangement of the cache of the above-mentioned microcomputer, a portion of a complete address output from the microcomputer is referred to as a tag address and the other portion thereof is referred to as a set select address. A part of the data stored in an external storage device is stored in a data memory portion of the cache. The tag address portion of an address designating data to be stored in the data memory section of the cache is stored in a tag memory section of the cache.

According to one aspect of the invention, the cache includes a tag memory section and data memory section organized into n sets, each set including m pages with all m pages designated by the same set select address. Each of the pages included in a set is designated a "way" so that the sections are organized into n sets (lines)×m way pages. Also included is a set select decoder for decoding the set select address included in a complete address output by the microcomputer core to designate one of the sets of m ways. A comparator compares the tag address included in the complete address to the m tag addresses designated by the set select address to select a unique way of the m ways in the set designated by the tag address included in the complete address. A way selector responds to the unique way designated by the tag address to select a unique page from the m pages in the set designated by the set select address.

The set select address can designate up to a first predetermined number, equal to an integer (i), of sets. For example, if the set select address were an 8-bit binary number then up to 256 sets could be designated. According to one aspect of the invention, the set select decoder only decodes a subset including a second predetermined number, equal to an integer (n), with n<i, of the (i) sets that could be designated with addresses in the subset included in a region of a sequence of addresses adjacent to a page boundary.

Accordingly, since sequences of addresses adjacent a page boundary are selectively registered in the cache, the number of accesses requiring the large numbers of bus lines to be switched between carrying no current and a high current is reduced.

According to another aspect of the invention, only sequences of addresses adjacent a page boundary and included in a subset of (n) select address of the possible number of (i) select addresses expressible by the binary code of the select address are registered to the cache and all other addresses formed by the remaining (i−n) bit patterns are not registered to the cache. The above and other objects, features, and advantages of the Invention will become more apparent from the following description when taken in conjunction with the accompanying drawings.

DESCRIPTION OF THE PREFERRED EMBODIMENT

Figure 1:
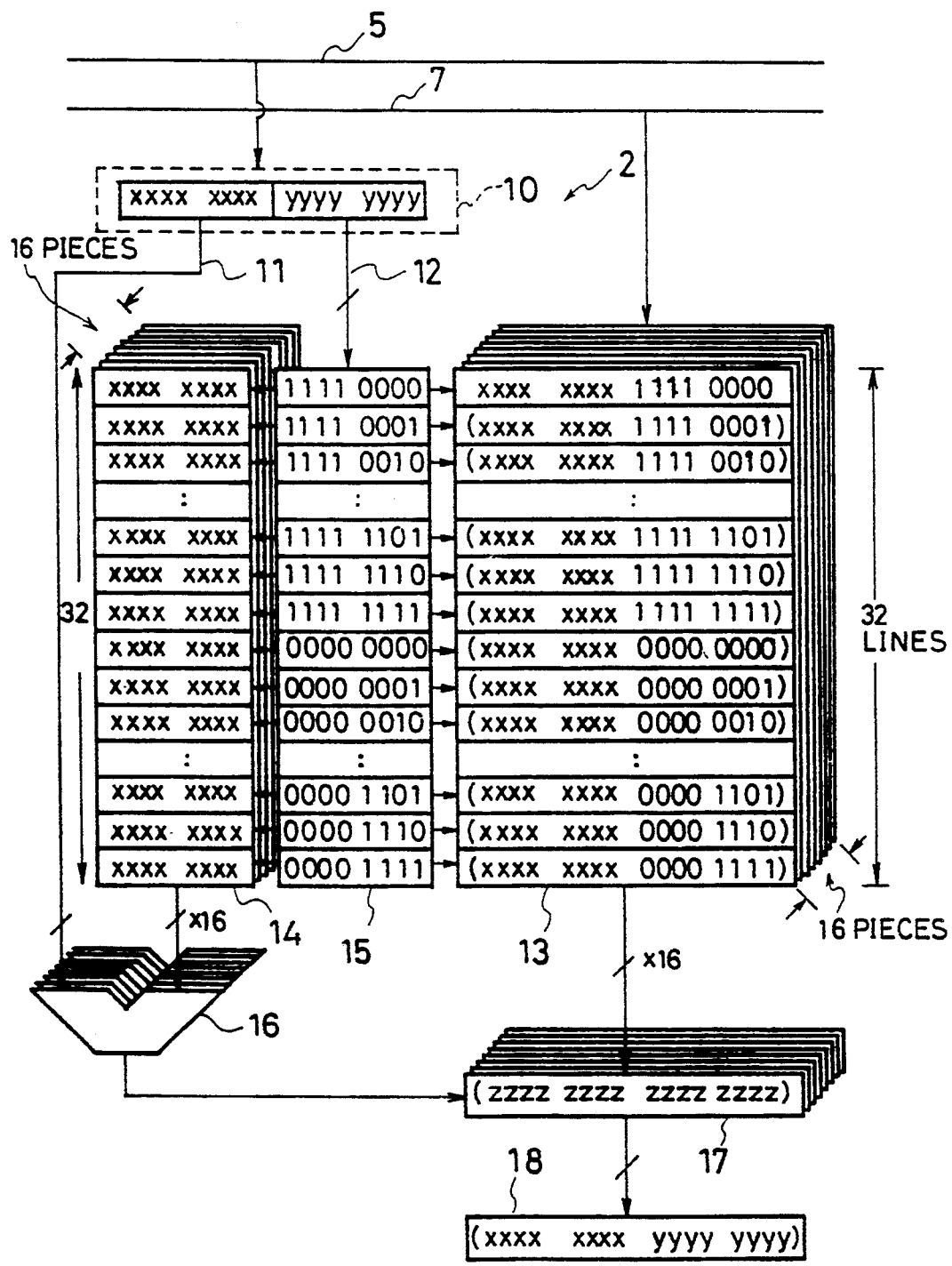
FIG. 1 a schematic illustration of an arrangement of a first embodiment of the present invention.

This invention will be described hereinbelow with reference to the drawings. Although the entire arrangement of a microcomputer according to this invention is the same as the arrangement illustrated in FIG. 2, the description will be made only in terms of a cache memory (8). Further, the bit arrangement of input data is the same as that of the conventional computer system. In FIG. 1, numeral 13 represents a data memory section for storing data by 32 sets (32 line addresses)×16 ways (depth 16 pages), 14 designates a tag memory section for storing a portion of the address for the data, which is to be registered in the data memory section 13, as the data tag by 32 sets×16 ways, and 15 depicts a set select decoder section for using a set select address 12 to cause a comparator (16) to output to a way selector 17 the tag address corresponding to 1 set (address)×16 way pages from the tag memory section 14 and the data memory section 13. In addition, numeral 16 denotes a 16-way comparator for comparing the tag address at every way with the 1-set ×16way tag address outputted from the tag memory section 14 and one tag address of the input address 10, and 17 a way selector section for outputting the data of the 16-way data which belong to the ways where the coincidence states are determined by the comparator 16. The capacity of the tag memory 14 is 32×16×8 bits and the capacity of the data memory section 13 is 32×16×32 bits.

Figure 3:
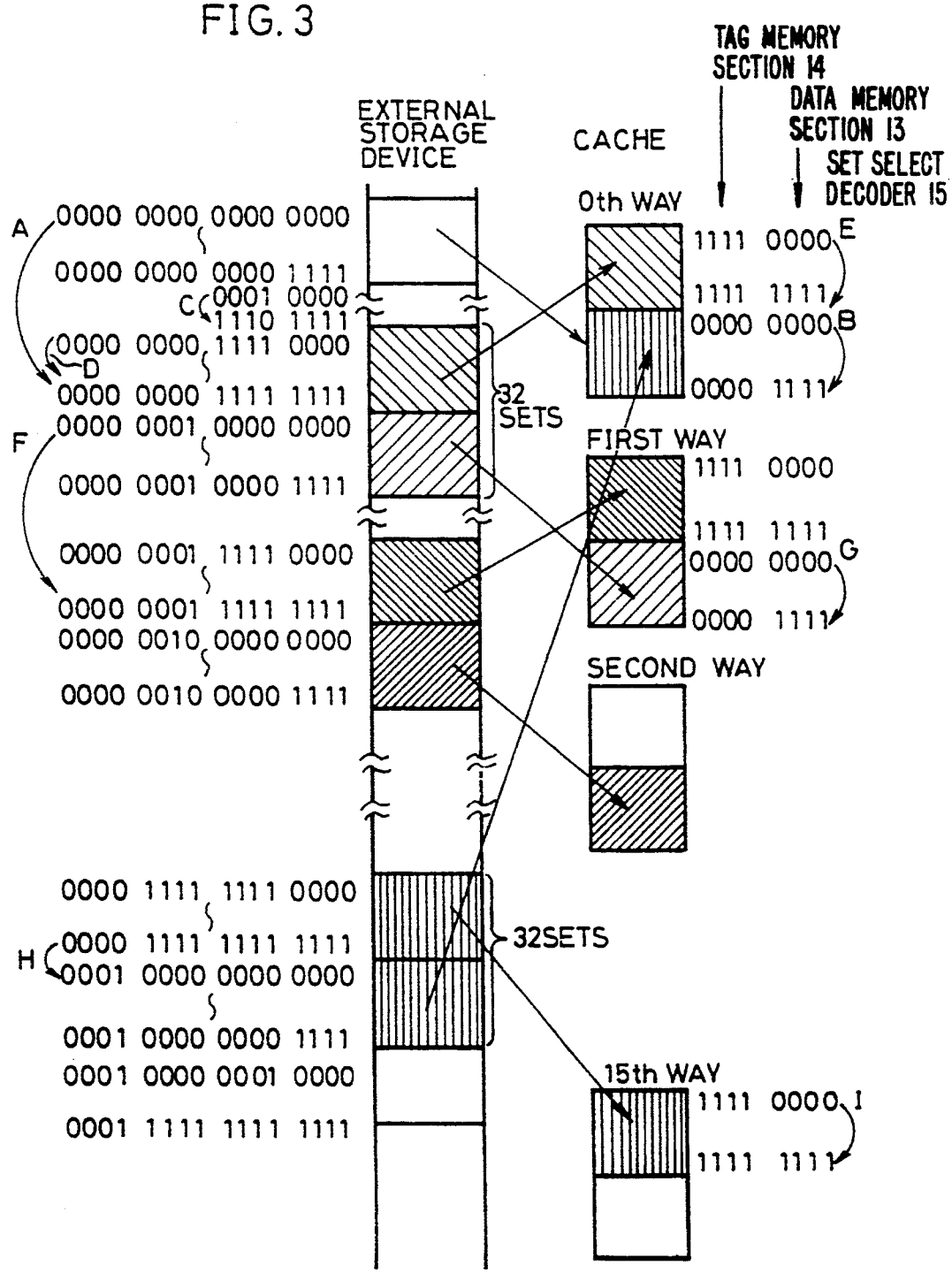
FIG. 3 is a memory map for indicating an operation of the first embodiment of this invention.
Figure 4:
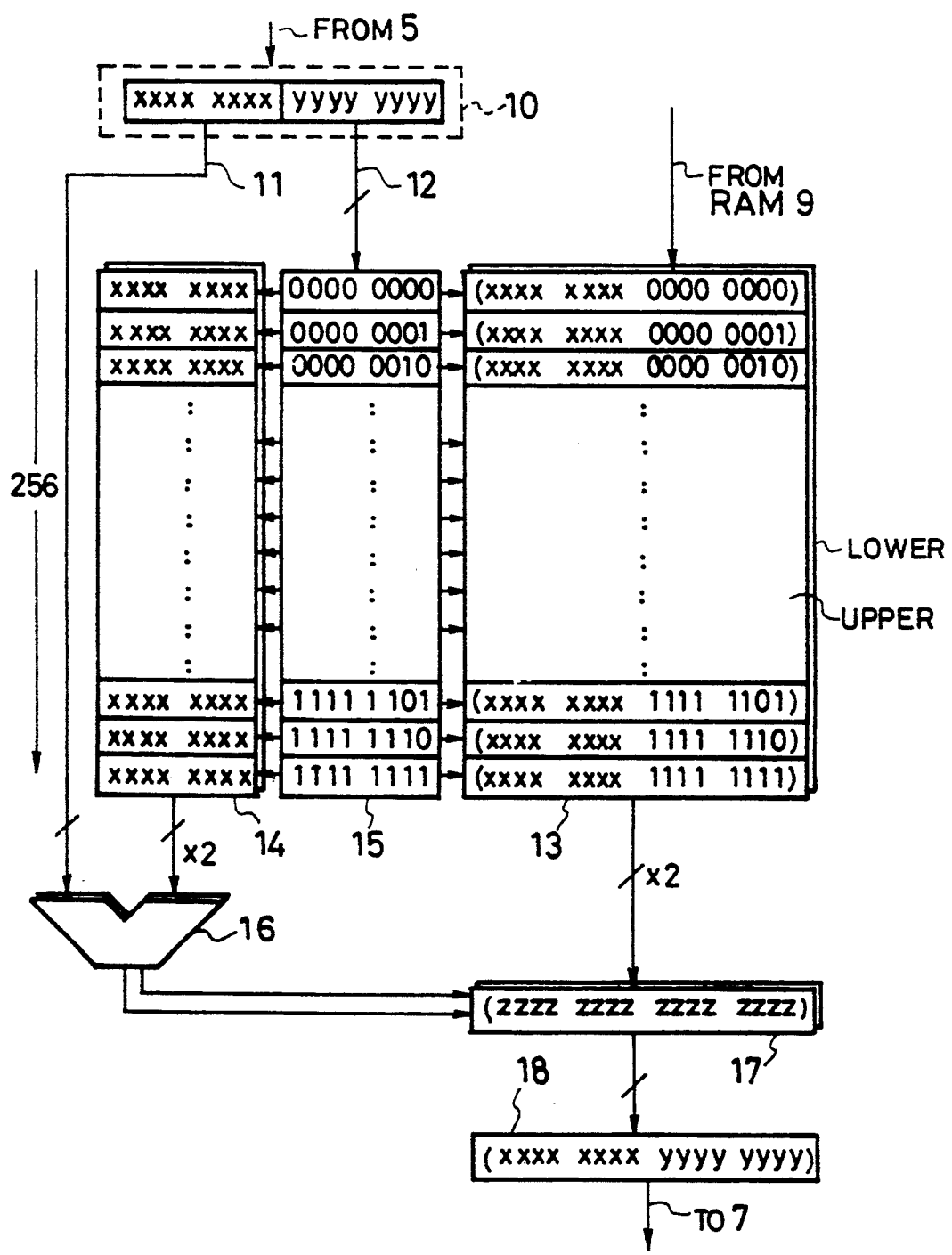
FIG. 4 is a schematic illustration of a cache arrangement of a conventional microcomputer system.
Figure 5:
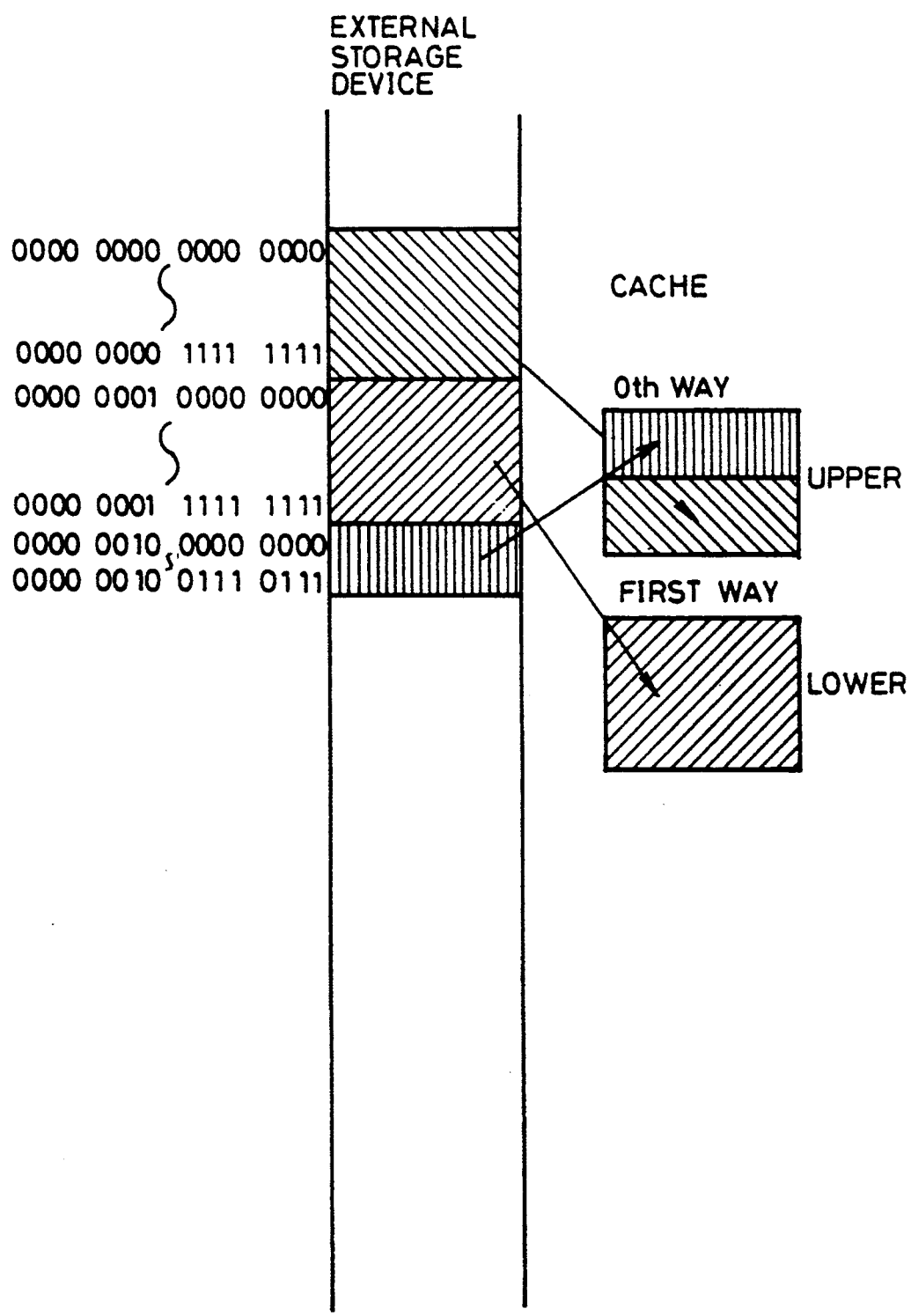
FIG. 5 is a memory map for indicating an operation of the conventional microcomputer system.

The number of the sets (addresses) to be selected by the set select decoder section 15 is, of 256 sets ("0000 0000" to "1111 1111") expressed by the set select address 12, the total 32 sets which is the sum of 16 sets ("0000 0000" to "0000 1111") and 16 sets ("1111 0000" to "(1111 1111"). The 32 sets (addresses) provided in the set select decoder section 15 are preset by a hardware or software technique and arranged so as not to be changed after the setting. In the case of input of the set select address 12 corresponding to 224 sets (the addresses that the number of the bit signals to be inverted is equal to or more than 4) other than the 32 sets, i.e., "0001 0000" to "1110 1111", the registration and the read-out are prohibited (that is, the cache memory is arranged so as not to be operated). The ways to be selected from 16-combination ways by the way selector section 17 are respectively expressed as 0th way, first way . . . 15th way in the direction from the upper side to the lower side in the illustration. FIG. 3 is a memory map indicating the operation of the cache according to this invention.

Figure 2:
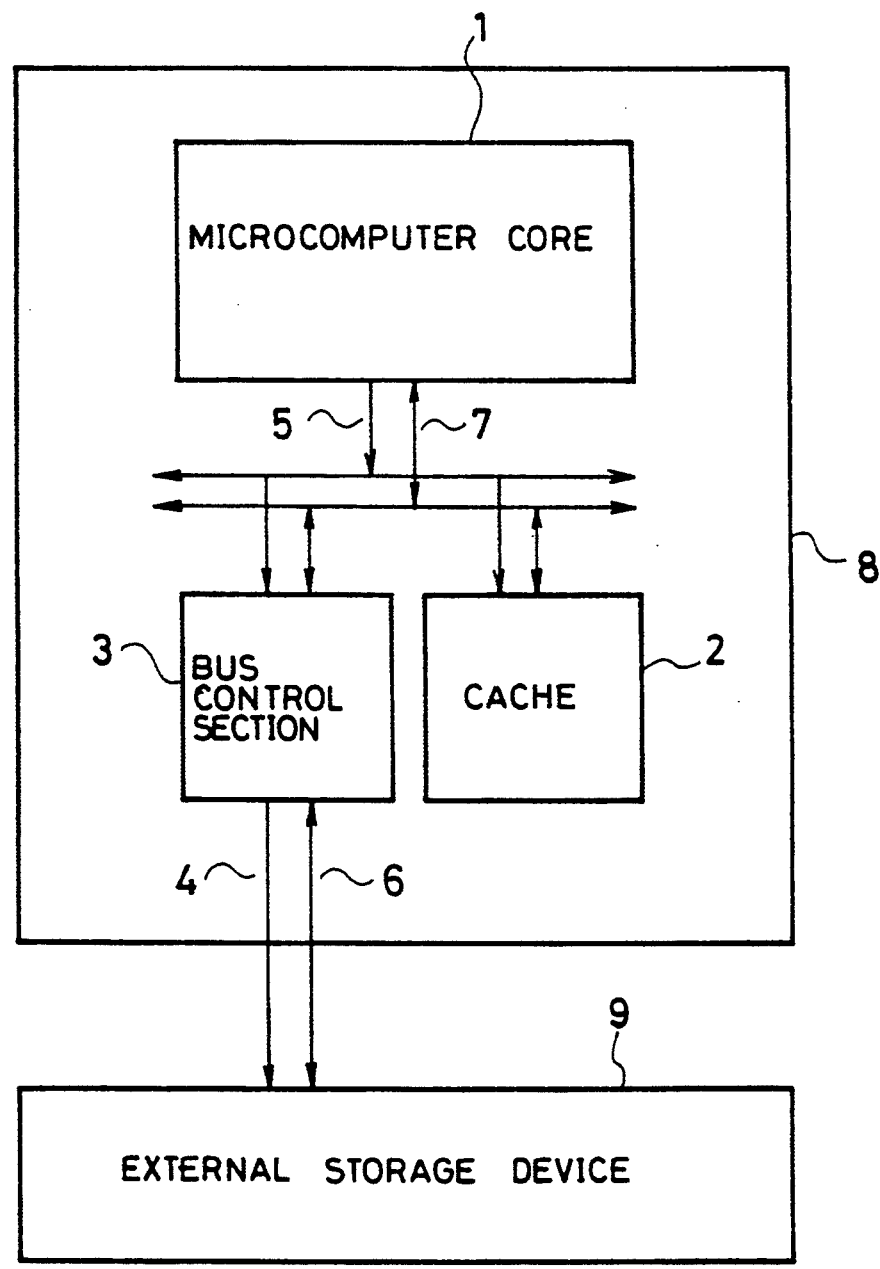
FIG. 2 a block diagram showing a prior art general microcomputer.

The data flow in the microcomputer with the cache according to this invention will be described hereinbelow with reference to FIGS. 1 and 2. For brevity, of the data of the external storage device 9, only the instruction for the microcomputer core 1 will be taken up. The data flow in the FIG. 2 microcomputer 8 will first be described.

The microcomputer core 1 outputs an address to the internal address bus 5 and as well as the conventional computer an instruction data is outputted from the cache (memory) 2 or the external storage device 9 so as to be supplied through the internal bus 7 to the microcomputer core 1. When reading out data from the cache 2, the bus control section 3 sets the external address bus 4 to the high-impedance state. When reading out data from the external storage device 9, the bus control section 3 outputs an address signal to the external address bus 4 to thereby read out the data from the external data bus 6. This data is given through the internal data bus to the microcomputer core 1. In addition, when the set select address 12 indicates any one of the total 32 sets which is the sum of 16 sets of "0000 0000" to "0000 1111" and 16 sets of "1111 0000" to "1111 1111" (the address that the number of bit signals to be inverted is below 4), the registration is made with respect to any one of the ways of the cache 2.

Secondly, a description will be made hereinbelow with reference to FIG. 1 in terms of the data flow in the cache 2. A 16-bit input address 10 is derived from the microcomputer core 1. The 8-bit set select address 12 of the input address 10 is given to the set select decoder section 15. The set select decoder section 15 supplies set select signals to the tag memory section 14 and the data memory section 13. Each way of the tag memory section 14 gives one set of selected address to the comparator 16 for the way. Each way of the data memory section 13 outputs one set of selected data to each way of the way selector section 17. The comparator 16 corresponding to each way compares one tag address 11 of the input address 10 with each tag address outputted from the tag memory section 14. If there are the coincidence ways, the information relating to the coincidence way is delivered to the way selector section 17. Since the data of each way of the set (address) corresponding to the set select address 12 is shifted to the way selector section 17, the way selector section 17 outputs the way data corresponding to the coincidence way. If no coincidence way, the bus control section 3 performs the registration operation from the external storage device 9 to the cache 2.

The registration to the cache 2 will be described hereinbelow with reference to FIGS. 1 and 3. For example, in the case that the microcomputer core 1 outputs the addresses of "0000 0000 0000 0000" to "0000 0000 1111 1111" (A) in sequence under the condition that the cache 2 is in the non-registered state, the tag address "0000 0000" is registered in the tag memory section 14 of the 0th-way set "0000 0000", the data "(0000 0000 0000 0000)" is registered in the data memory section 13 of the 0th-way set address "0000 0000", and the registration is successively effected with respect to the 0th-way set address "0000 0001", 0th-way set "0000 0010". . . 0th-way set "0000 1111" (B). Furthermore, the data from "0000 0000 0000 0000" to "0000 0000 0000 1111" are registered into the data memory section 13. The data corresponding to the addresses of "(0000 0000 0001 0000)" to "(0000 0000 1110 1111)" (C) where the number of bit signals in the address inverted between "0" and "1" may be more than 5, are not registered because that data is not decoded by the set select decoder 15. For addresses of "(0000 0000 1111 0000)" to (0000 0000 1111 1111)", where the number of bit signals in the address inverted between "0" and "1" is always less than 5, the select addresses are registered in the 0th-way set "1111 0000" to "1111 1111" (E) in tag memory section because that data is decoded by the set select decoder section 15.

Further, in the case that the microcomputer core 1 continuously outputs the addresses from "0000 0001 0000 0000" to "0000 0001 1111 1111" (F) in sequence, the data are registered into 16 sets of the first-way set '0000 0000' to the first-way set "0000 1111" and 16 sets of the first-way set "1111 0000" to the first-way set "1111 1111" (G) in the next page of each tag memory section 14. Here, the 32-set data at the vicinity that the address varies from "0000 0000 1111 1111" to "0000 0001 0000 0000" results in being registered into the total 32 sets, i.e., the sum of 16 sets of 0th-way set "1111 0000" to 0th-way set 1111 1111" and 16 sets of the first-way set "0000 0000" to the first-way set "0000 1111", in the cache 2.

Similarly, in the case that in FIG. 3 the microcomputer core 1 continuously outputs the addresses up to the highest "0001 0000 0000 1111" in sequence, the data "(0000 0000 0000 0000)" to "(0000 0000 0000 1111)" first registered in the 0th-way set "0000 0000" to 0th-way set "0000 1111" in the data memory section 13 are removed and the data "(0001 0000 0000 0000)" to "(0001 0000 0000 1111)" are registered newly.

Here, the 32-set data at the vicinity that the address varies from "0000 1111 1111 1111" to "0001 0000 0000 0000" (H) result in being registered in the total 32 sets, i.e., the sum of 16 sets of the 15th-way set "1111 0000" to the 15th-way set "1111 1111" (I) and 16 sets of the 0th-way set "0000 0000" to the 0th-way set "0000 1111" (B) in the cache 2. Generally, the total 16 groups (0 to 15 way (page), 32×16) of the 32-set data at the vicinity that the address varies from "xxxx xxxx 1111 1111" to "yyyy yyyy 0000 0000" are registered in the cache 2.

Further, a description will be made hereinbelow with reference to FIGS. 1 and 3 in terms of the reading of the cache 2. When the microcomputer core 1 outputs "0000 1111 1111 1111" under the condition that the data is registered in the cache 2 as described above, the set "1111 1111" of the set select decoder section 15 is selected, and the tag addresses "0000 0000", "0000 0001", "0000 0010", ... "0000 1111" are outputted from the respective sets (addresses) "1111 1111" of the 0th way to the 15th way in the tag memory section 14 so as to be inputted to the corresponding ways of the comparators 16. The tag address of each way is compared with the tag address "0000 1111" of the input address 10 in the comparator 16. The respective data "0000 0000 1111 1111" to "0000 1111 1111 1111" of the 0th way to the 15th way corresponding to the set (address) "1111 1111" are inputted from the data memory section 13 to the respective ways of the way selector section 17. Since the 15th-way tag address takes the coincidence state, the 15th-way data "(0000 1111 1111 1111)" is outputted from the way selector section 17.

Furthermore, in response to the microcomputer core 1 outputting "0001 0000 0000 0000", the set "0000 0000" of the set select decoder 15 is selected, and the respective tag addresses "0001 0000", "0000 0001", "0000 0010", "0000 0011", ... "0000 1111" are outputted from the sets "0000 0000" of the 0th way to the 15th way in the tag memory section 14. The tag address of each way is compared with the tag address "0001 0000" of the input address 10 in the comparator 16. The data "0001 0000 0000 0000" to "0000 0000 0000 1111" in the 0th way to the 15th way corresponding to the set "0000 0000" are inputted from the data memory section 13 to the respective ways of the way selector section 17. Since the 0th-way tag address takes the coincidence state, the 0th-way data "(0001 0000 0000 0000)" is outputted from the way selector section 17.

Thus, in cases where the microcomputer core 1 sequentially outputs the addresses of a given region included in the address region from "0000 0000 0000 0000" to "0001 1111 1111 1111", since the 32-set data at the vicinity that the address varies from "xxxx xxxx 1111 1111" to "yyyy yyyy 0000 0000" are always read out from the cache 2, the external address bus 4 takes the high-impedance state from before 15 sets (addresses) where the address varies from "xxxx xxxx 1111 1111" to "yyyy yyyy 0000 0000", and the address is again started to be outputted after the variation and after 15 sets. At the address where the number of inversion of the bit signal becomes equal to or more than 5, it is not necessary to make the high-impedance state by driving a transistor circuit requiring a great consumption power at the time of the driving, thereby preventing the generation of noises due to variation of the power. The generation of noises at the page boundary can be prevented.

Since the cache according to this invention is arranged to be effective only with respect to a specific region, the effect of a generally arranged cache which is to quickly supply information to the microcomputer core in place of the low-speed external storage device can be obtained under a condition, and a combination of the cache of this invention and the general cache becomes more useful.

As described above, according to this invention, the bit pattern of the addresses registrable to the cache is limited so that the page boundary region is selectively registered in the cache, and therefore it is possible to provide an effect to reduce the number of times of accesses of the microcomputer to an external in the region that the address signal greatly varies. Moreover, the cache of this invention is arranged such that the number of sets of the n-set x m-way tag memory section and data memory section is, of i groups expressible by the set select address, n sets corresponding to n groups (n<i) at the vicinity of a bit pattern indicating a page boundary so that the page boundary region is selectively registered in the cache, and hence only the data corresponding to the address including n bit patterns in the page boundary region is registered in the cache and on the other hand the data corresponding to the address including the remaining (i−n) bit patterns is not registered in the cache. Thus, the number of times of accesses of the microcomputer to an external can be reduced in a region that the address signal greatly varies.

What is claimed is:

1. In a microcomputer including a microcomputer core, an internal cache memory, a bus control unit, internal address and data buses for coupling said core, said bus control unit and said internal cache, and external address and data buses for coupling said bus control unit and an external storage device having a capacity much greater than said internal cache, with the address space of said external storage device including a set of tag addresses identifying blocks of storage locations and a set of a first predetermined number of select addresses identifying the location of storage locations in said block, with a selected storage location in said external storage device addressed by a complete address comprising a tag address part identifying a block of storage locations including the selected storage location and a select address part being a selected one of said set of select addresses identifying the location of said selected storage location within said block, said internal cache comprising:

- a cache data store having storage locations for storing data registered in the cache;
- a cache tag store having tag store storage locations for storing the tag part of a complete address;
- a set select decoder, having an input coupled to receive the select address part of said complete address provided by said microcomputer core, for decoding only a first subset of said set of select addresses including a second predetermined number, being smaller than said first predetermined number, of select addresses which identify sub-blocks of storage locations adjacent to an upper and lower block boundary of each block of storage locations, and for accessing storage locations in said cache data store and said cache tag store for each select address in said first subset decoded by said set select decoder so that storage locations adjacent to block boundaries are registered to the cache to avoid driving the external bus when signal values comprising said select address change between all high (logic 1) and all low (logic 0) at the boundary of a block.

2. The system of claim 1 wherein a first complete address is received from said microcomputer core, with said first complete address comprising a first tag address and a first select address, with said first select address included in said first subset, and wherein:

- said cache data store includes a plurality of data store storage locations accessed by said first select address;
- said tag store includes a like plurality of tag store storage locations accessed by said first select address;
- said set select decoder accesses said plurality of data store and tag store storage locations when said first select address is decoded; and further comprising:
- means, coupled to receive first tag address output from said microcomputer core, and coupled to said cache data store and said cache tag store to receive tag addresses accessed from said plurality of tag store storage locations and data accessed from said plurality of data store storage locations for selecting data accessed from a single storage location in said data store identified by said first tag address.

3. The system of claim 2 wherein said means for selecting comprises:

- a comparator circuit, coupled to receive said tag addresses accessed from said tag store, for concurrently comparing said tag addresses with said first tag address to select data accessed from a unique one of said plurality of data store storage locations.

* * * * *